US007537168B2

(12) United States Patent
Anderson et al.

(10) Patent No.: US 7,537,168 B2
(45) Date of Patent: May 26, 2009

(54) PROMOTIONAL ASSEMBLY

(75) Inventors: Timm R. Anderson, River Falls, WI (US); James R. Meis, Stillwater, MN (US); Robert J. Cygan, Eagan, MN (US); Lee R. Lund, Hugo, MN (US); Franklin R. Rice, Elk River, MN (US); Kent A. Madson, Eden Prairie, MN (US); Gregg R. Temple, Mendota Heights, MN (US); Matthew J. Moffett, Wayzata, MN (US)

(73) Assignee: The Meyers Printing Companies, Inc., Minneapolis, MN (US)

( * ) Notice: Subject to any disclaimer, the term of this patent is extended or adjusted under 35 U.S.C. 154(b) by 36 days.

(21) Appl. No.: 11/753,855

(22) Filed: May 25, 2007

(65) Prior Publication Data

US 2007/0278293 A1 Dec. 6, 2007

Related U.S. Application Data

(60) Provisional application No. 60/803,176, filed on May 25, 2006.

(51) Int. Cl.
*G06K 19/00* (2006.01)
*G06K 19/02* (2006.01)
*G06K 15/00* (2006.01)

(52) U.S. Cl. ....................... 235/487; 235/375; 235/380; 235/383; 235/488; 40/124.11; 40/124.12; 40/124.16

(58) Field of Classification Search ................. 235/380, 235/375, 383, 487, 488; 40/124.11–142.16
See application file for complete search history.

(56) References Cited

U.S. PATENT DOCUMENTS

| | | | | |
|---|---|---|---|---|
| 3,716,439 | A | 2/1973 | Maeda | |
| 4,100,011 | A | 7/1978 | Foote | |
| 4,109,047 | A | 8/1978 | Fredrickson | |
| 4,287,285 | A | 9/1981 | Mosehauer | |
| 4,930,814 | A | 6/1990 | Nusmeier | |
| 4,978,146 | A | 12/1990 | Warther et al. | |
| 5,080,748 | A | 1/1992 | Bonomi | |
| 5,171,625 | A | 12/1992 | Newton | |
| 5,308,121 | A | 5/1994 | Gunn | |
| 5,417,458 | A | 5/1995 | Best et al. | |
| 5,688,738 | A | 11/1997 | Lu | |
| 5,735,550 | A | 4/1998 | Hinkle | |
| 5,776,287 | A | 7/1998 | Best et al. | |
| 5,839,763 | A | 11/1998 | McCannel | |
| 6,007,660 | A | 12/1999 | Forkert | |
| 6,315,023 | B1 | 11/2001 | King et al. | |
| 6,588,658 | B1 * | 7/2003 | Blank | 235/380 |
| 6,769,718 | B1 | 8/2004 | Warther et al. | |
| 6,773,181 | B2 | 8/2004 | Crum | |
| 6,984,083 | B2 | 1/2006 | Crum | |
| 2002/0088855 | A1 * | 7/2002 | Hodes | 235/385 |

(Continued)

*Primary Examiner*—Thien M. Le
*Assistant Examiner*—Tuyen K Vo
(74) *Attorney, Agent, or Firm*—Nawrocki, Rooney & Sivertson, P.C.

(57) ABSTRACT

A promotional sheet assembly assembleable from components of a single material web processed in a multi-station press is provided. The assembly includes opposing surfaces bearing printed information and/or indicia thereon, and a consumer premium delimited by one or more of visible, revealable, and/or machine readable information.

23 Claims, 10 Drawing Sheets

U.S. PATENT DOCUMENTS

| | | | | |
|---|---|---|---|---|
| 2004/0026916 | A1* | 2/2004 | Thompson et al. | 283/61 |
| 2004/0074128 | A1 | 4/2004 | Best et al. | |
| 2005/0045732 | A1* | 3/2005 | Whitaker | 235/493 |
| 2006/0080871 | A1* | 4/2006 | McGoey et al. | 40/124.11 |
| 2007/0108294 | A1* | 5/2007 | Rossiter | 235/492 |

* cited by examiner

PROMOTIONAL ASSEMBLY

This is a regular utility application filed under 35 U.S.C. §111(a) claiming priority under 35 U.S.C. §119(e)(1), of provisional application Ser. No. 60/803,176, filed May 25, 2006, and incorporated herein by reference in its entirety.

TECHNICAL FIELD

The present invention generally relates to promotional articles, more particularly, to promotional assemblies which display advertising and/or marketing information and advantageously include a consumer premium, transaction card, etc., and more particularly still, to promotional sheet products characterized by combinations of visible, revealable, and/or machine readable information or data.

BACKGROUND OF THE INVENTION

Considerable resources are directed to product and/or service promotions, whether at the point-of-sale, or remotely, such as via a targeted advertisement, e.g., a mailer, magazine, etc. As a threshold matter, merchandise and/or product labeling, marking, and packaging are critical initial and ongoing considerations. Arguably, naming, visual identity creation, branding and cross-branding are essential ingredients for strong marketplace differentiation intended to influence the purchasing behavior of consumers.

A variety of well-known point-of-purchase and promotional products are available. For instance, vehicles for advertising and promoting products, grabbing the attention of consumers, and/or prompting impulse or first time purchases include, but are hardly limited to, static clings, tent cards, shelf talkers, hanging mobiles, bottle neckers, hanging tags, instant redeemable coupons, etc.

Marketplace transactions themselves, namely, the interaction between consumers and the sellers of goods and services, have been and continue to be influenced by promotional strategies and trends, and generally reflect, for example, technological advances. Heretofore unknown levels of interaction are enabled and in practice, whether at a point-of-sale or purchase, or as is increasingly the case, in advance of the point-of-sale, or in follow-on or subsequent thereto. The "reach" of, for example, the manufacturers of consumer packaged goods, is advancing and increasing via the use of promotional sheet products, e.g., including but not limited to, point-of-purchase promotional articles and/or devices, mailers, coupon redemption cards, consumer cards, and card display packages and the like.

It is generally appreciated that within the realm of promotional sheet products there exists a tension between general utility on the one hand (e.g., a message conveyance functionality), and a specific or transactional utility on the other hand (e.g., an information or data conveyance functionality in furtherance of the relationship between the "buyer" and "seller"). Heretofore known promotional sheet product approaches have generally emphasized a single aspect of functionality, e.g., general functionality as exhibited by point-of-purchase articles such as static clings, tent cards, shelf talkers, hanging mobiles, bottle neckers, hanging tags, instant redeemable coupons, or specific functionality as exhibited by consumer cards and the like.

Consumer cards are ubiquitous in the marketplace. Without limitation, credit and debit cards, credit cards, promotional cards, stored value cards, phone cards, gift cards, membership cards, swipe cards, loyalty cards, frequent buyer cards, club cards, key cards, identification cards, etc. are well known and widely used.

Emanating from a variety of merchant credit schemes, credit cards are alleged to have origins in "Looking Backward," an 1887 utopian novel by Edward Bellamy, with uses in the U.S. dating back at least to the 1920s (see e.g., Des. 76,525 (H. W. Cook) entitled "Credit Card"). Beyond the arguably mundane articles of the 1960s (see e.g., U.S. Pat. No. 3,069,793 (D. L. Francescon)), the design of the card itself has become a major selling point vis-a-vis co-branded and affinity cards. Current/recent efforts appear to focus upon, among other things, card security (see e.g., U.S. Pat. No. 7,128,274 B2 (Kelley et al.) and U.S. Pub. No. US 2007/0057037 A1 (Woronec)).

As is well known, consumer cards may include a variety of different indicia to identify the card, the individual using the card, the transaction account, and/or other features or characteristics such as one or more of visible, revealable, and/or machine readable information or data fields, areas or portions. Often times, card or product indicia may include a string of alpha numeric characters, a bar code, and/or an encoded magnetic strip attached to the card. Heretofore, such transaction cards have been limited in their construction to plastic and/or synthetic materials such as PVC, PET, PETG, ABS, etc., with ISO specifications, i.e., ISO 7810, adopted for such cards. Needless to say, such traditional, heretofore known formats for transaction cards are an inherent constraint relative to content, quality, features, character, etc. vis-a-vis manufacturing process limitations.

In furtherance of the best-of-both-worlds synergy in and for promotional sheet products, a variety of well and lesser known approaches have been documented. On the one hand, the following general approaches are noted: credit/service cards having an expanded surface area (U.S. Pat. No. 5,308,121 (Gunn)); coupon redemption cards and assemblies (U.S. Pat. No. 5,417,458 (Best et al.)); sheet product mailers (U.S. Pat. No. 6,769,718 B1 (Warther et al.)); and, magnetic promotional sheet article (U.S. Pat. No. 6,773,181 B2 (Crum)), each of which is incorporated herein by reference. On the other hand, the following specific approaches, namely, card display packages, are noted: U.S. Pat. No. 5,918,909 (Fiala et al.); U.S. Pat. No. 5,921,584 (Goade, Sr.); U.S. Pat. No. 6,588,658 B1 (Blank); U.S. Pat. No. 7,000,844 B1 (Smith); U.S. Pat. No. 7,063,255 B2 (Algiene); and, U.S. Pub. No. US 2004/0074128 A1 (Best et. al.), each of which is likewise incorporated herein by reference.

Although there exists a diversity for and in promotional sheet products as evidenced at least in part by the afore presented teachings, there nonetheless remains a need for a versatile promotional sheet product. Among other things, it is believed advantageous to provide a promotional sheet product characterized by ease of manufacture while nonetheless possessing a variety of select desirable features, alone or in combination, such as, without limitation, source indicia, graphics, promotional messages, visible, revealable, and/or machine readable information or data, etc. Furthermore, it is believed advantageous to provide a non-rigid promotional sheet product which retains the general functionality of heretofore known rigid promotional sheet products, more particularly, and for example, heretofore known transaction cards and related card display packages. Further still, it is believed advantageous to provide a promotional sheet product manufactured from a single sheet or web, and more particularly, a promotional sheet product which includes alone or in combination, visible, revealable, and/or machine readable information or data, and more particularly still, removable means for selectively viewing a hidden data field, and/or one which is readily adapted to receive/retain a machine-readable data storage article or the like.

BRIEF SUMMARY OF THE INVENTION

The promotional assembly of the subject invention generally includes first and second opposingly paired panels, plies, etc. e.g., front (F) and back (B) panels. Both the front and back panels advantageously originate from a single sheet or web (i.e., material) which is processed so as to bear preselected printing on opposing surfaces thereof, such processing greatly accelerating product fabrication while contributing to (i.e., permitting) limited batch production of “specialty” or limited edition print assemblies or products.

Each front and back panel includes opposing sides, namely, outside (O) and inside (I) view surfaces. Advantageously, printed or otherwise applied indicia X and/or Y is carried by the inside view surface of the front panel. In relation thereto, the back panel includes corresponding portions X' and/or Y' one of which may be user manipulated so as to reveal the underlying indicia X and/or Y. Furthermore, the outside view surface of the back panel may include a visible bar code and/or an encoded magnetic strip applied thereto, more broadly, a machine-readable data field containing machine readable data. Further still, it is contemplated that the assembly include transaction card characteristics and functionality, as for example via inclusion of such characteristic features in the assembly per se, or vis-a-vis a subassembly, advantageously, a disintegratable subassembly (e.g., a transaction card separable from an auxiliary (i.e., promotional) member of the assembly as by a line-of-weakness or the like). Yet further still, a media package, more particularly, a media card is likewise contemplated, namely, a promotional assembly, which in addition to one or more of the aforementioned features, is adapted to hold and secure a machine-readable data storage article.

In a first, preferred, non-limiting embodiment, a promotional assembly is generally and advantageously provided, more particularly, a promotional assembly having first and second panels, each having first and second surfaces. The first surface of the first panel defines a first exterior surface for the promotional assembly and advantageously includes or bears promotional information thereon. The second surface of the first panel generally includes at least a single information field containing information.

The second panel, which is in opposition to the first panel and is selectively affixed thereto, further includes a portion overlaying an information field of the at least a single information field of the second surface of the first panel of the assembly. The first surface of the second panel defines a second exterior surface for the promotional assembly and advantageously includes or bears promotional information thereon. The portion of the second panel overlaying the information field of the at least a single information field is adapted such that select manipulation of the portion reveals information of the at least a single information field containing information underlying same.

In a further non-limiting embodiment, the assembly is characterized by a disintegratable subassembly. Advantageously, at least select information fields of at least a single information field containing information is carrier by the subassembly, with the disintegratable subassembly adapted to carry machine-readable information.

In yet a further non-limiting embodiment, the assembly, via selective union of first and second panels, is characterized by a compartment for receipt and retention of a machine-readable data storage article. Preferably, a panel of the assembly panels is adapted to facilitate loading, holding and securing the article, and is further adapted to permit viewing a portion of an article held in the compartment.

The promotional sheet assembly of the subject invention advantageously, but not necessarily, utilizes a supremely efficient multi-step flexographic process: a single sheet or web is fed to a multi-station press which produces a composite sheet promotional assembly, and selectively, an assembly including a divisible or disintegratable subassembly having a functionality substantially equivalent to heretofore known consumer cards, more particularly, ISO transaction cards.

A preferred method of manufacture of a promotional consumer assembly of the subject invention includes selectively applying commercial indicia, namely, static graphics such as promotional information to a first surface of a single material in a multi-station press, a first portion of portions of the first surface of a single material thereby bearing a first characteristic commercial indicia (e.g., graphics, branding, and/or other source/merchandise identifying content connected to a promotion), a second portion of portions of the first surface of a single material thereby bearing a second characteristic commercial indicia (e.g., details of the promotion). Additional indicia, namely, variable data such as codes or other unique correlative character strings or the like, is selectively applied to areas of a first portion of portions of a second surface of the single material so as to define a plurality of indicia fields for the first portion. Finally, selective operations are performed upon areas of an entirety of the single material, the areas registerable with the plurality of variable data or indicia fields for the first portion of portions of the second surface of the single material.

More specific features and advantages obtained in view of the summary features will become apparent with reference to the drawing figures and DETAILED DESCRIPTION OF THE INVENTION.

BRIEF DESCRIPTION OF THE DRAWINGS

Referring now to the drawings wherein like numerals are used to designate like parts of the invention throughout the figures.

DETAILED DESCRIPTION OF THE INVENTION

Figure 2B:
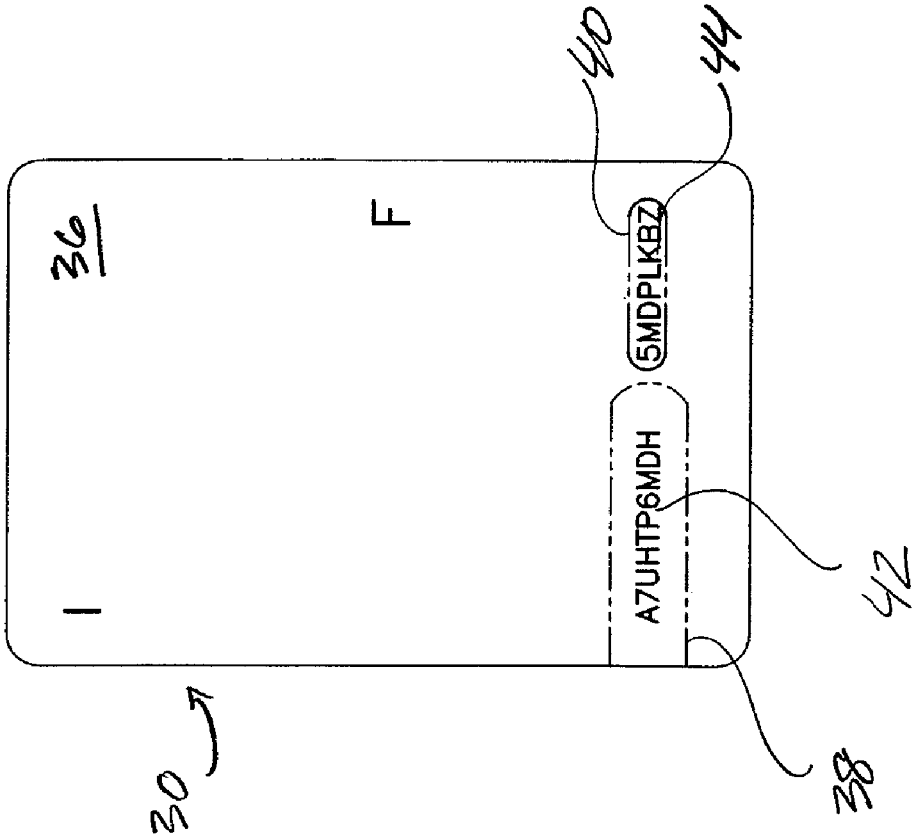
FIGS. 2A/2B depict the first or front (F) panel of the assembly of FIG. 1, more particularly, an exterior or outside (O) surface (2A) and interior or inside (I) surface (2B) thereof.
Figure 2A:
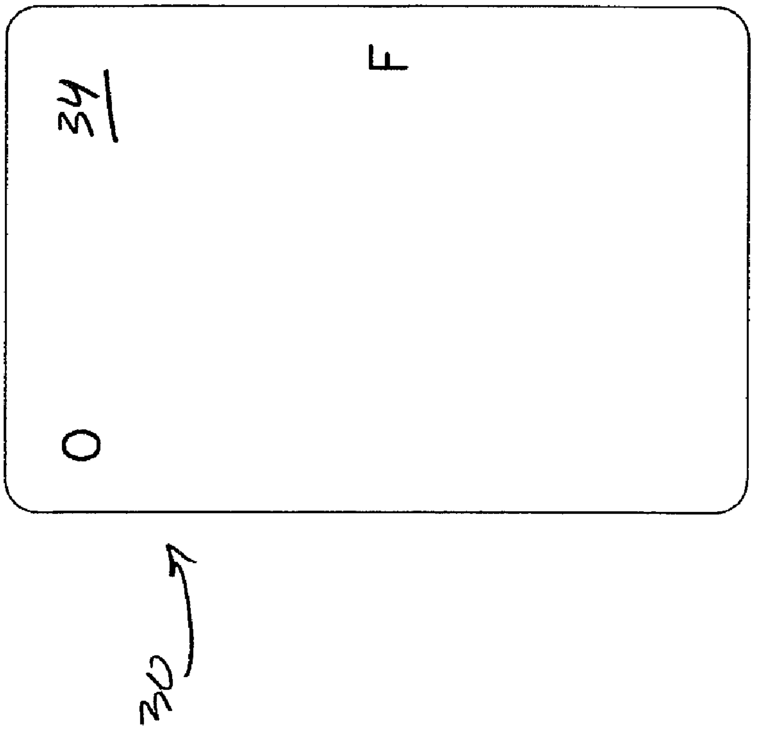
Figure 3B:
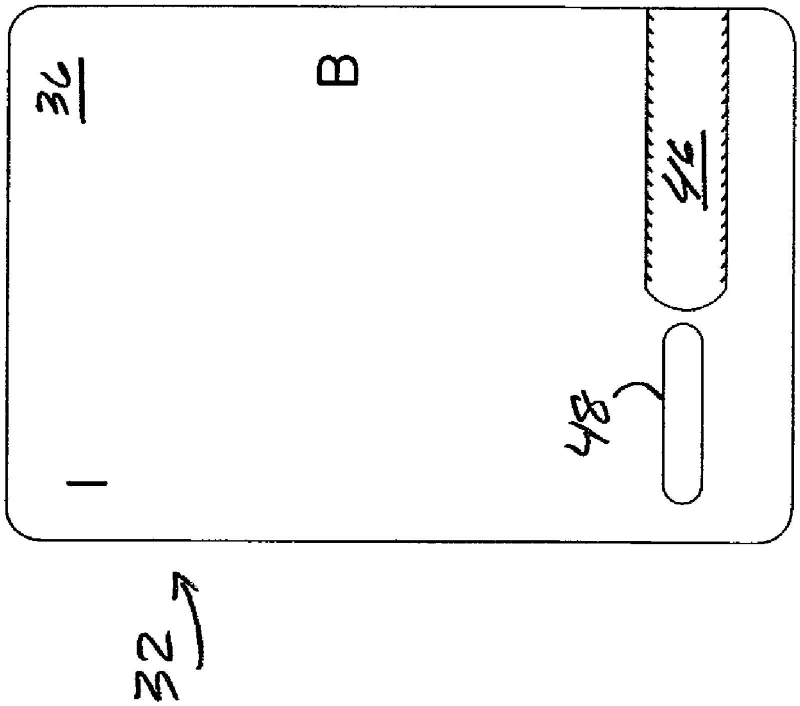
FIGS. 3A/3B depict the second or back (B) panel of the assembly of FIG. 1, more particularly, an exterior or outside (O) surface (3A) and interior or inside (I) surface (3B) thereof.

With general reference to the figures, namely, FIGS. 1-4, there is shown a preferred, non-limiting embodiment of the subject invention (FIG. 1) and related details thereof (FIGS. 2-4). Likewise, further non-limiting preferred embodiments of the subject invention are depicted in FIGS. 5 & 7 having reference numerals +100 and +200, respectively, for like structures, features and/or elements.

Prior to a detailed discussion of the specific features of the preferred, non-limiting embodiments of FIGS. 1, 5, & 7, several preliminary observations are warranted to facilitate such discussion. Generally, a promotional sheet product is provided, more particularly, a promotional assembly characterized by selectively united opposing panels, for example, first and second panels. A portion of the assembly generally includes a "premium," advantageously, either alone or in combination, one or more of visible, revealable, and/or machine readable information or data, advantageously, either alone or in combination, variable data or static graphics. To the extent that the premium has value apart from the "promotion" of the assembly, the premium may be advantageously configured as a subassembly of the promotional assembly, more particularly, a disintegratable subassembly (e.g., FIGS. 1 & 5). Furthermore, via selective union of the panels of the assembly, and advantageous adaptation of a panel thereof, a packaging or carrying functionality is obtained for same (FIG. 7).

For the sake of context, in-as-much as the assemblies of FIGS. 1, 5 & 7, and variants thereof, have numerous advantageous applications, both in relation to the kind/character of goods and/or services to which they might relate, their functional environment, e.g., a mailer, insert, card display package, etc., and more particularly, their ability and adaptability to convey visible, revealable, and/or machine readable information or data, or select combinations thereof, in furtherance of commercial transactions vis-a-vis a premium or otherwise, membership/subscription cards, i.e., access transactions, are a non-limiting application to which the subject description of preferred embodiments is directed. For example, and without limitation, in-as-much-as the following detailed discussion is directed to the promotional assembly of the subject invention, a context or advantageous application is gaming and/or software applications, more particularly, conveying access details, such as variable, unique codes, with regard to subscriptions, memberships, etc., prepaid or otherwise, for access, downloads or otherwise, regarding same.

Figure 1A:
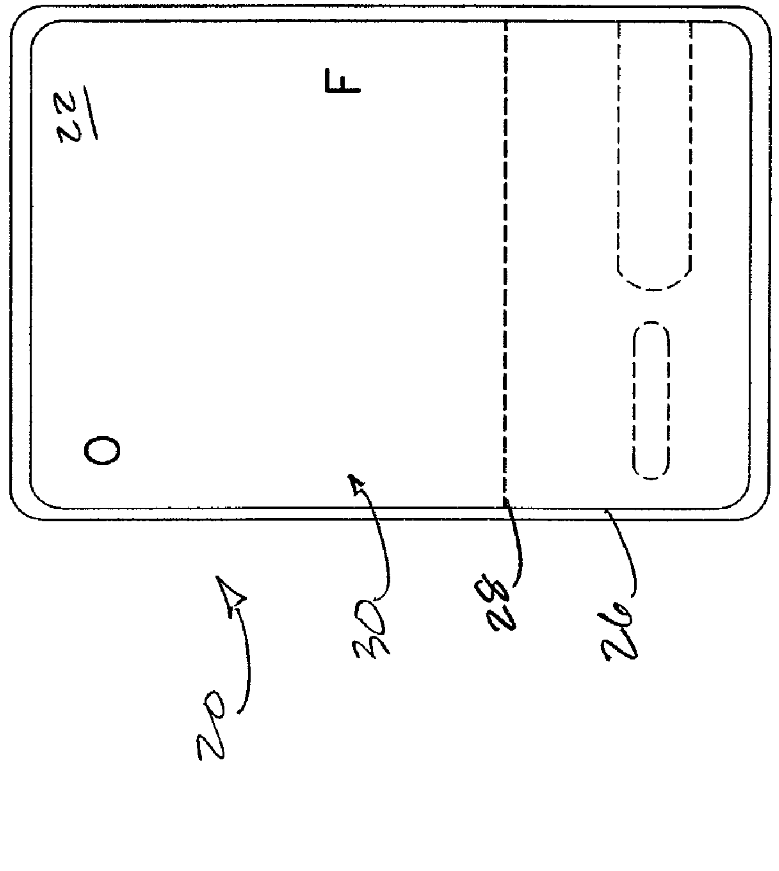
FIGS. 1A/1B depict a promotional assembly of the subject invention, more particularly, “front” (F) and “back” (B) surfaces thereof, namely, outside (O) surfaces of first (1A) and second (1B) panels thereof.
Figure 1B:
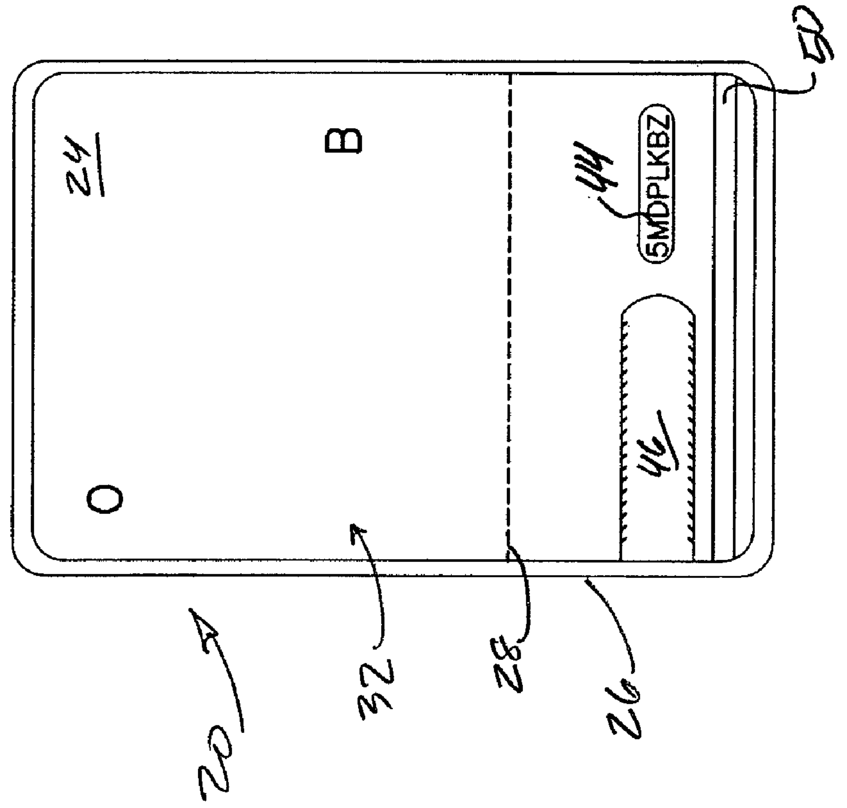

With reference to FIG. 1, and selectively to FIGS. 2-4, there is depicted a first embodiment 20 of the promotional assembly of the subject invention. The assembly 20 advantageously includes a portion characterized by one or more of, alone or in combination, visible, revealable, and/or machine readable information or data. "Front" (FIG. 1A) and "back" (FIG. 1B) views of the assembly 20 are depicted in FIGS. 1A & 1B respectively, more particularly, front 22 and rear 24 viewable or exterior surfaces thereof. It should be appreciated that terms such as "front," "back," "first," "second," "top," "bottom," etc. are generally used as reference monikers, intended to further the presentation and discussion of relationships and interrelationships among and between the elements and/or feature of the assembly. To facilitate the subject discussion, the drawings selectively include reference characters "O," "I," "F," and "B" corresponding, in short-hand fashion, to "outside," "inside," "front," and "back" respectively for the assembly or panels thereof as the case may be.

The promotional assembly 20 is characterized by a premium in the form of a disintegratable subassembly, e.g., a wallet or pocket card 26 as shown, delimited by a line-of-weakness 28 or other such feature which facilitates selective disintegration of the subassembly from the assembly, and generally includes first/front 30 and second/back 32 panels (FIGS. 2 & 3 respectively). The first 30 and second 32 panels each have first/outside 34 and second/inside 36 surfaces (FIGS. 2A/3A and FIGS. 2B/3B, respectively) which generally correlate to outside and inside panel "views" (FIG. 4) in furtherance of defining the assembly (FIG. 1).

As to the first panel 30 (FIG. 2), the first surface 34 thereof defines first exterior surface 22 for the promotional assembly 20 (FIG. 1A) and advantageously includes or bears promotional information thereon, namely, static graphics such as, for example, source identifying indicia. The first surface 34 of the first panel 30 essentially or primarily functions as a "canvas," i.e., a message conveyance medium.

The second surface 36 of the first panel 30 (FIG. 2B) generally includes at least a single information or data field containing information/data, more particularly, and preferably as shown, a pair of variable data fields 38, 40 containing, by way of reference only, a revealable access or activation code 42, and a visible product code 44. Although there need not be any particular configuration or other spatial relationship between the data fields of the first panel, it is advantageous, especially in connection to a disintegratable subassembly, to "bunch" or otherwise "group" the fields, and, for reasons to become apparent with a discussion of the second panel, locate the revealable access or activation code proximal to an edge of margin of the panel.

The second panel 32 (FIG. 3), which is in opposition to the first panel 30 and is selectively affixed thereto (FIG. 4), generally includes a portion or segment overlaying an information field of the at least a single information field of the second surface of the first panel of the assembly (FIG. 2B). Preferably, but not necessarily, the second panel includes or may be equipped with a machine-readable information or data field containing information/data.

The first surface 34 of the second panel 32 defines second exterior surface 24 for the promotional assembly 20 (FIG. 1B) and advantageously includes or bears promotional information i.e., static graphics such as offer/redemption details and/or instruction related to the promotion, merchandise or service thereon. The portion or segment of the second panel overlying the information field of the at least a single information field is adapted such that select manipulation of the portion reveals information of the at least a single information field containing information underlying same. For example, the second panel includes a disengageable strip or the like (e.g., a perforated removable tab 46 as shown) intended to overlay revealable variable data of the first panel, more particularly, revealable unique access or activation code 42 of the second surface 36 of the first panel 30. Other known concealment mechanism are likewise contemplated, advantageously, tamper evident concealment mechanisms such as mechanical structures (e.g., discrete strips, coverings, etc.), "scratch-off" coatings and the like, or alternate interfaces between portions of the panel of the assembly which permit removal in furtherance of viewing the revealable information or data.

Figure 3A:
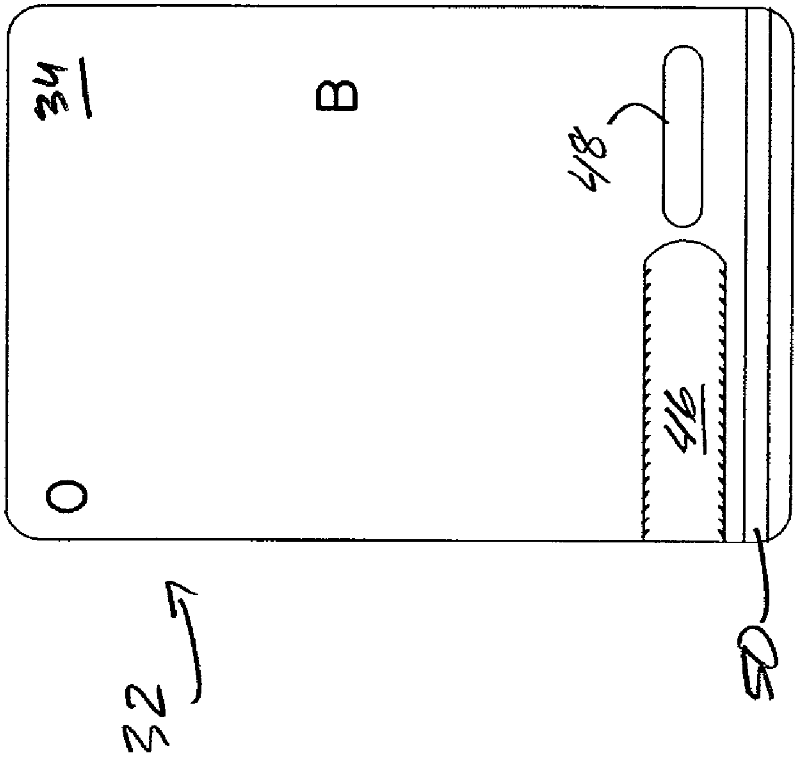
Figure 4B:
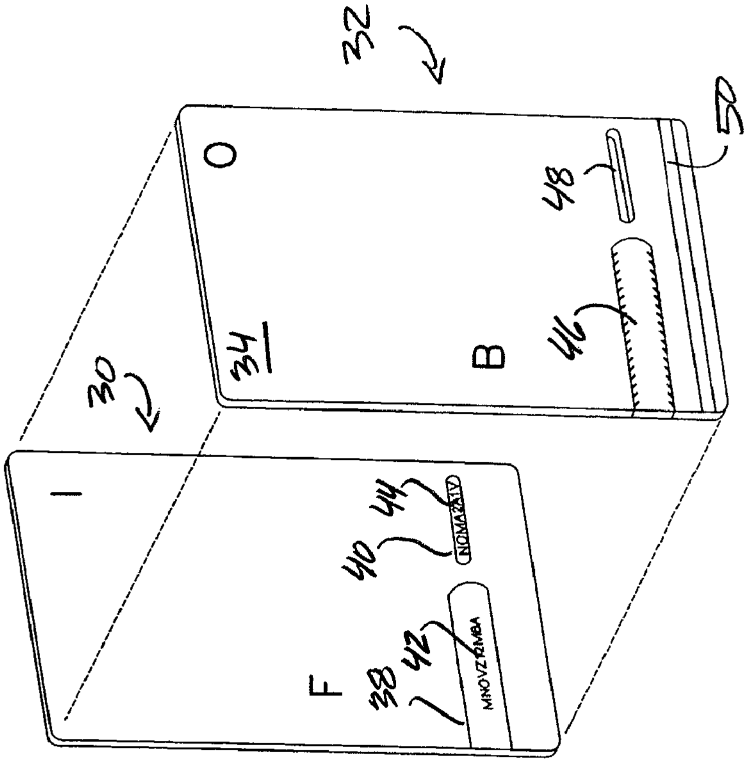
FIGS. 4A/4B depict relationships of the panels of FIGS. 2 & 3, namely, relationships with reference to the first/front panel (4A), and again with reference to the second/back panel (4B)

The second panel 32 further includes a "window" or cutout, more broadly, an aperture 48 as shown (FIG. 3), and may be suitably equipped with a magstrip (i.e., magnetic stripe 50), advantageously as shown in any of FIG. 1B, 3A, or 4B in connection with the first surface 34 of the second panel 32, or other such machine-readable information field containing machine readable information or code(s) such as optical characters (e.g., bar codes, UPC codes and the like), or more generally, digital information in forms generally well know as well as those emerging. Likewise, in conjunction thereto, or in the alternative, the assembly of the subject invention may easily be adapted to include integrated circuit chips and/or radio frequency identification (RFID) as the functionality of the assembly warrants. As should be readily appreciated, the machine-readable information of the machine readable information field may be amenable to direct (i.e., contact) reading, or remote reading as applications or circumstances warrant.

Generally, information of the at least a single information field of the at least a single information field containing information of the first panel is intended to register with corresponding features of the second panel which permit or are adapted to permit viewing the information. As best seen in connection to FIG. 4B, the window 48 of the second panel 32 overlays the information of an information field of the first panel, more particularly, the product code or information 44 of the second surface 36 of the first panel 30 (i.e., the panel window permits the visible information of the correspondingly aligned panel of the assembly to be readily visible, discernable, or apparent to a viewer (FIG. 1B)).

Figure 4A:
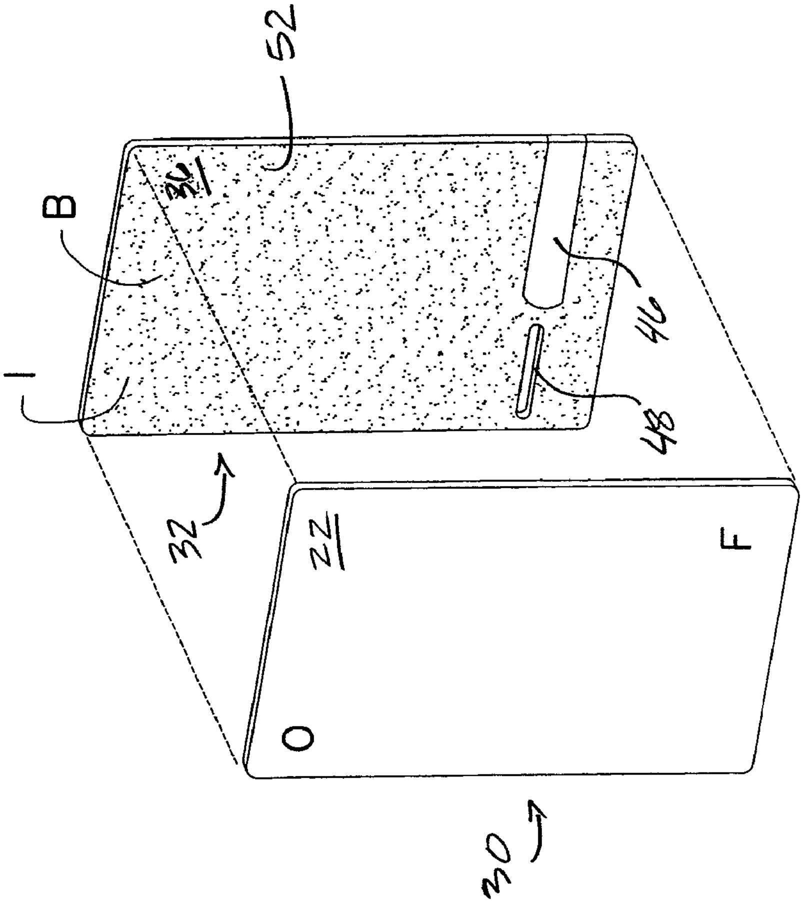

With reference now to FIG. 4, an advantageous selective union of the panels is illustrated, namely, as referenced or depicted from the first sides 34 of the first 30 (FIG. 4A) and second 32 (FIG. 4B) panels. Adhesive 52 or the like is interposed between the panels 30, 32 in furtherance of their union, with an effective amount preferably applied as shown to the second surface 36 of the second panel 32, namely, throughout the entirety of the surface adjacent the portion of the panel adapted such that manipulation thereof reveals the information underlying same, i.e., the "hidden" or back side of the perforated removable tab 46.

Figure 5B:
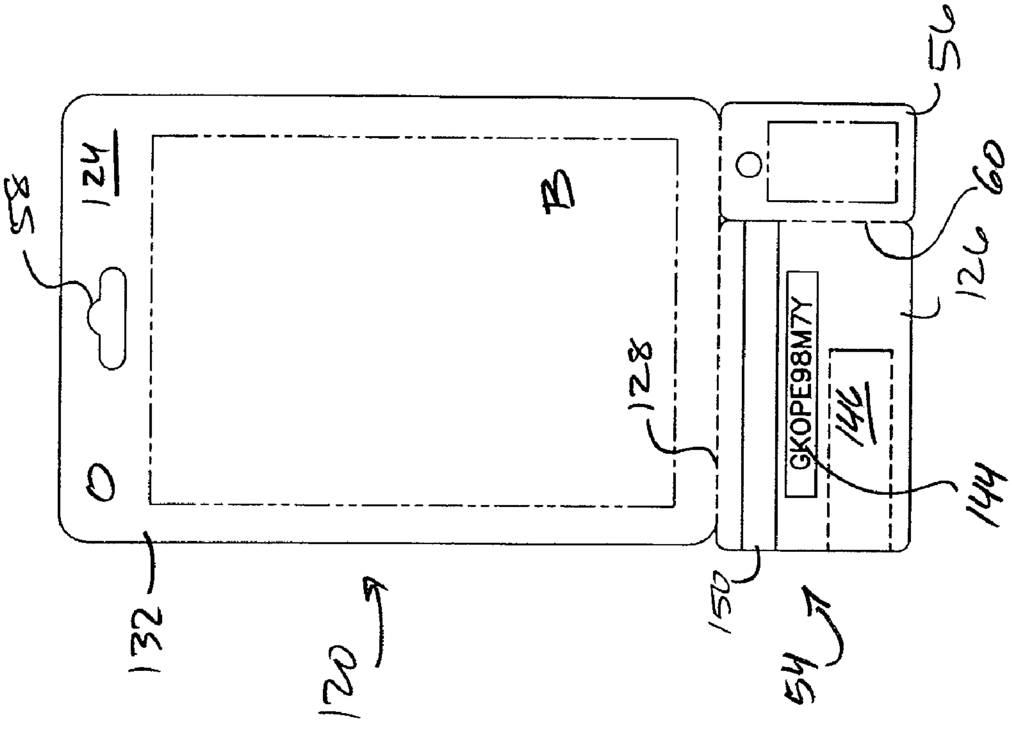
FIGS. 5A/5B depict a further promotional assembly of the subject invention, more particularly, “front” (F) and “back” (B) surfaces thereof, namely, outside (O) surfaces of first (5A) and second (5B) panels thereof.
Figure 5A:
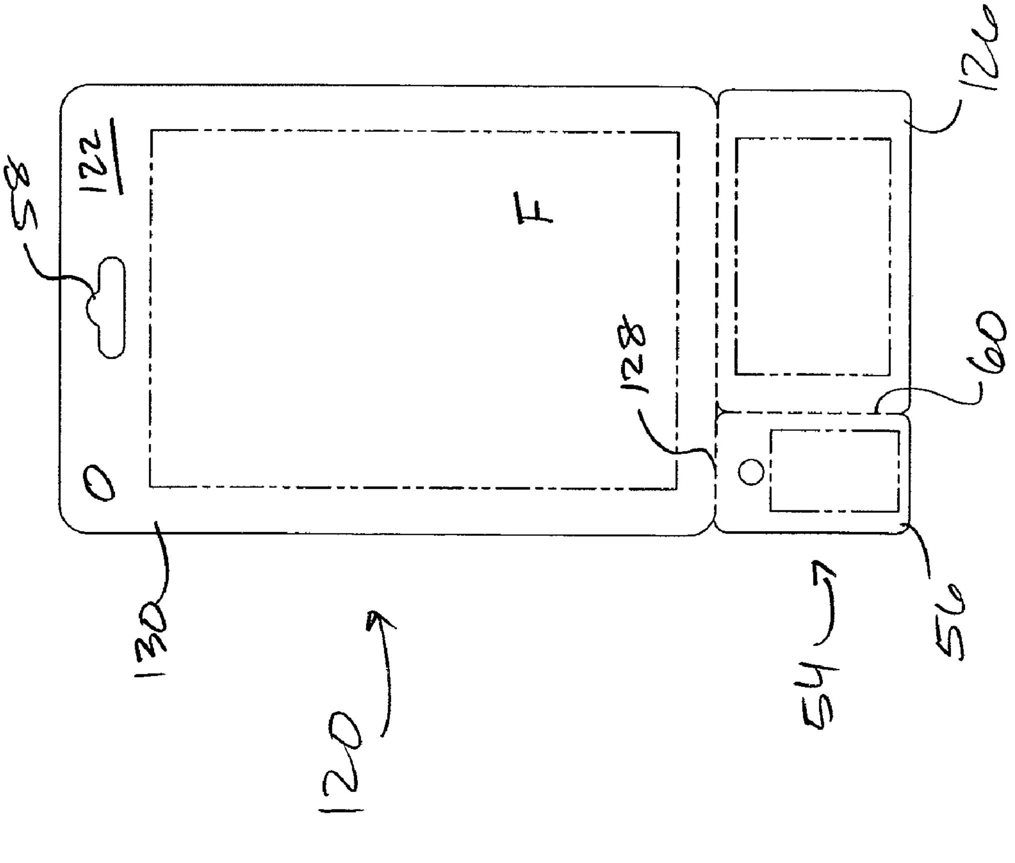
Figures 6A, 6B:
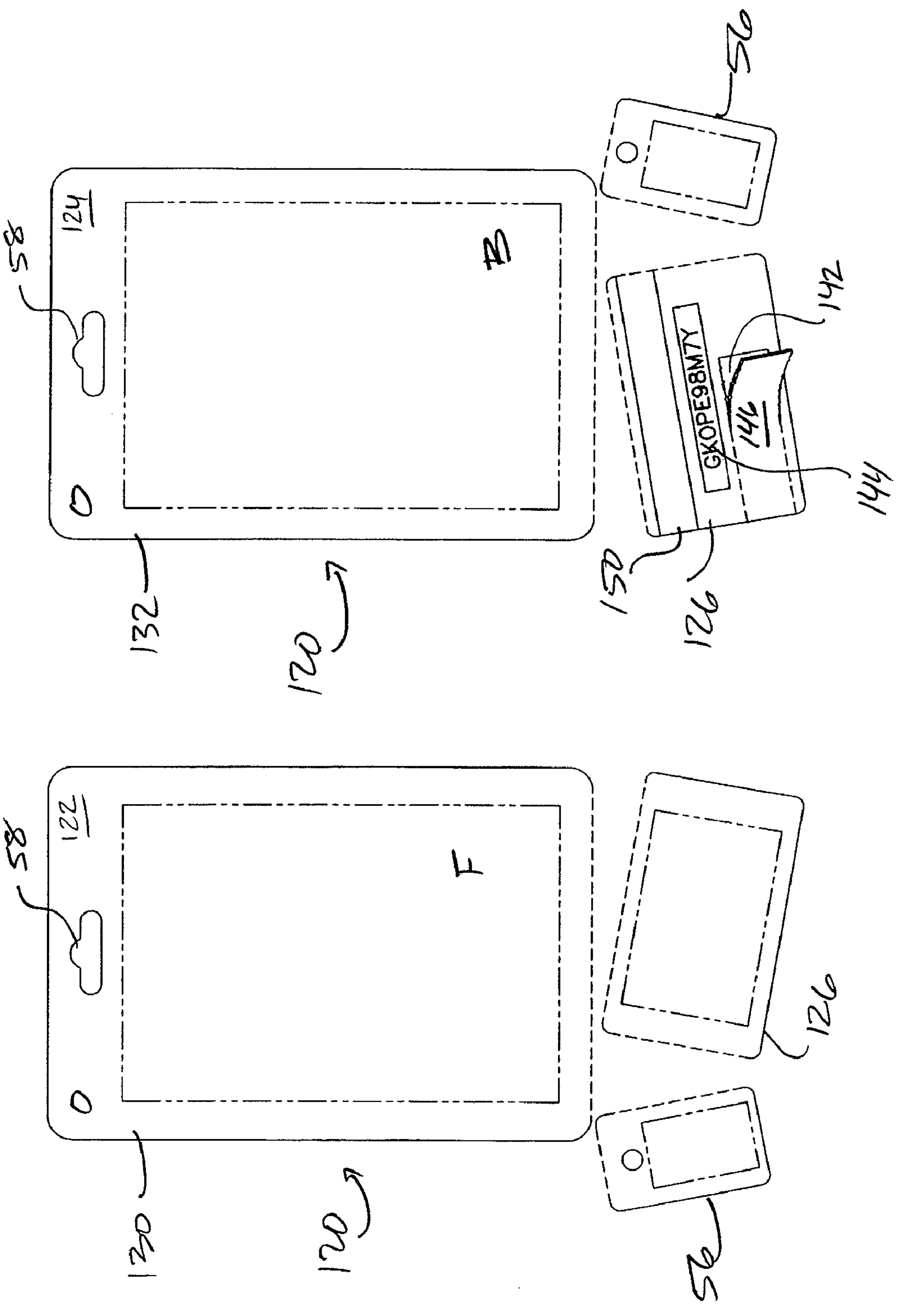
FIGS. 6A/6B, which generally correspond to the views of FIGS. 5A/5B, depict disintegration of a disintegratable subassembly of the assembly.

With reference now generally to FIGS. 5 & 6, a variant of the assembly of FIG. 1 is depicted, more particularly, an assembly 120 wherein the premium, i.e., disintegratable subassembly 54, includes a wallet card 126 and a key fob 54. Consistent with the embodiment of FIG. 1, the subject variant includes selectively united first 130 and second 132 panels having first sides delimiting front 122 (FIG. 5A) and rear 124 (FIG. 5B) viewable exterior surfaces for the assembly. The disintegratable subassembly 54 is delimited by a line-of-weakness 128 or the like which bisects the assembly as shown, advantageously into dominant and subordinate portions, the dominant portion characterized by an aperture 58 in furtherance of a suspend display of the assembly.

The subassembly itself includes a line-of-weakness 60 or the like, advantageously extending orthogonally from the line-of-weakness 128 delimiting the subassembly 54 to an edge of the assembly, namely a minor edge of the assembly as shown. As is readily appreciated with reference to FIG. 6, the line-of weakness of the subassembly essentially defines the subassembly components, namely, the wallet card 126 and key fob 56.

Again, advantageously, the assembly includes either alone or in combination, one or more of visible, revealable, and/or machine readable information or data, more particularly, in an arrangement or configuration so as to be at least features of the wallet card (FIGS. 5B/6B). The subassembly, more particularly, a select surface of the wallet card includes a magnetic strip 150, a visible access code 144 the like, and a revealable pin number 142 or the like, generally concealed via an overlay, more particularly and preferably, a tamper evident panel portion 146 that is readily manipulated by a consumer (FIG. 6B) in furtherance of executing a transaction related to the promotion.

Figure 8:
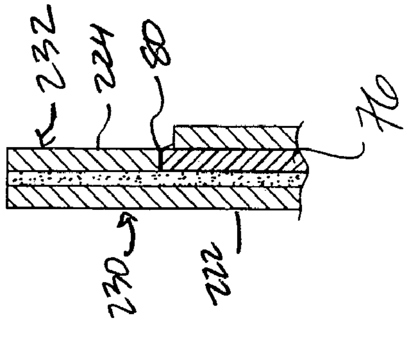
FIG. 8 is a sectional view about 8-8 of FIG. 7B depicting a media compartment functionality for the assembly.
Figure 7B:
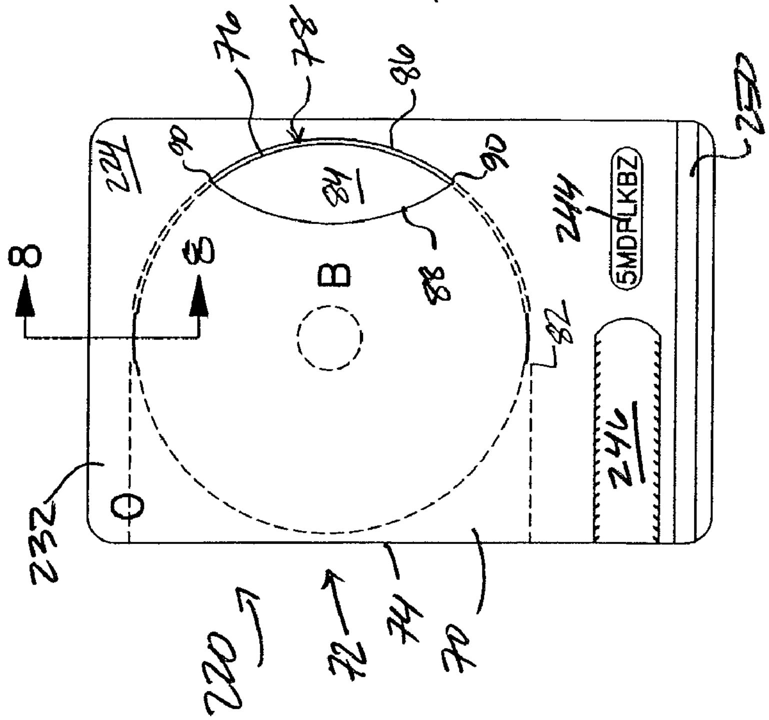
FIGS. 7A/7B depict yet a further promotional assembly of the subject invention, more particularly, “front” (F) and “back” (B) surfaces thereof, namely, outside (O) surfaces of first (6A) and second (6B) panels thereof.
Figure 7A:
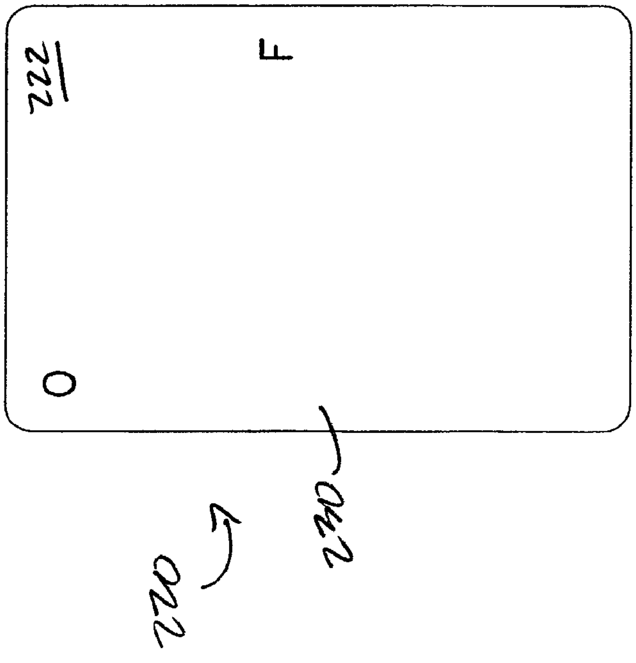
Figure 9B:
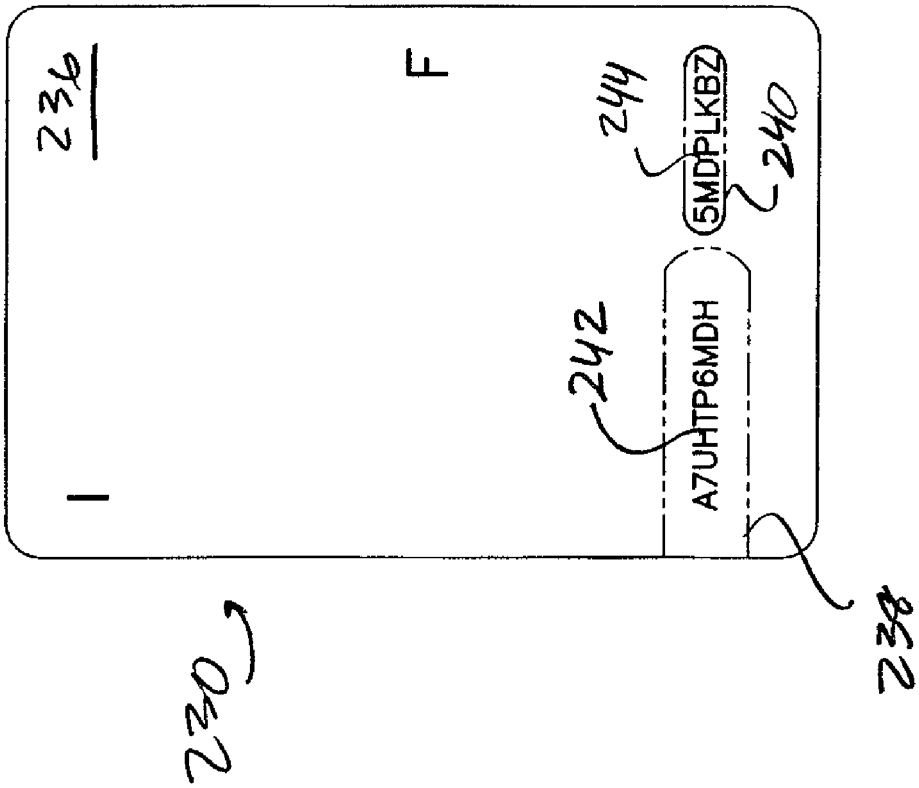
FIGS. 9A/9B depict the first or front (F) panel of the assembly of FIG. 7, more particularly, an exterior or outside (O) surface (9A) and interior or inside (I) surface (9B) thereof.
Figure 9A:
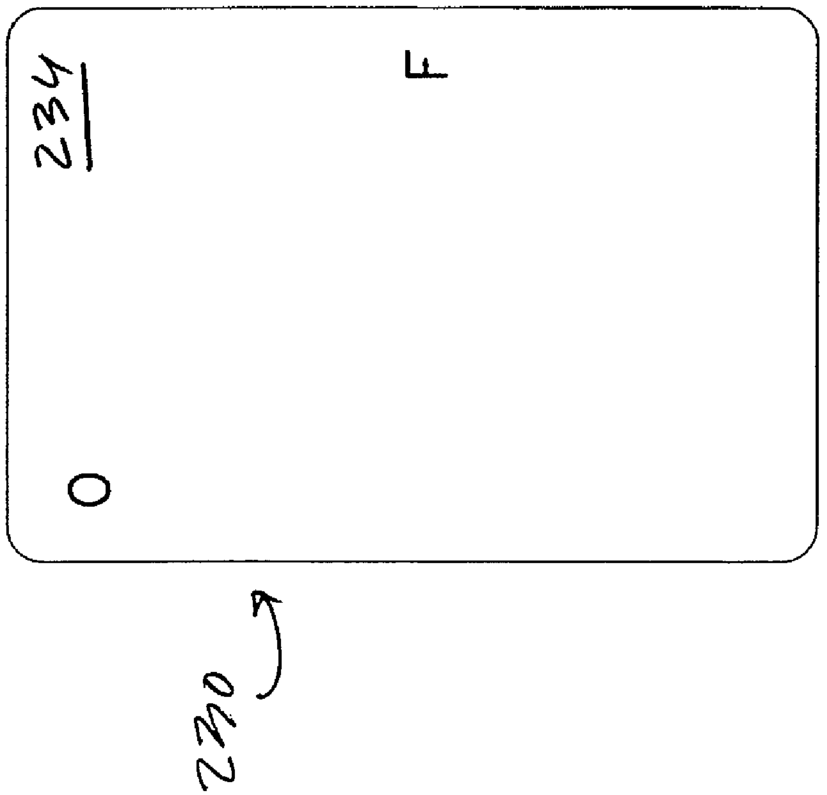
Figure 10B:
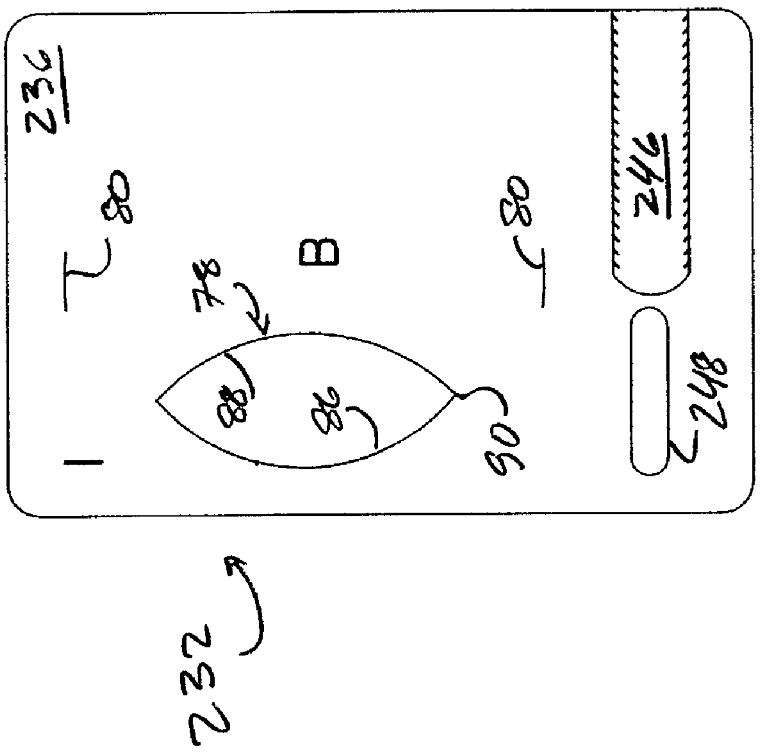
FIGS. 10A/10B depict the second or back (B) panel of the assembly of FIG. 7, more particularly, an exterior or outside (O) surface (10A) and interior or inside (I) surface (10B) thereof; and, FIGS. 11A/11B depict relationships of the panels of FIGS. 9 & 10, namely, relationships with reference to the first/front panel (7A), and again with reference to the second/back panel (7B).

With reference to FIGS. 7 & 8, and selectively to FIGS. 9-11, yet a further non-limiting embodiment of the promotional assembly of the subject invention is depicted. As prior embodiments, the subject assembly 220 advantageously includes a portion characterized by one or more of, alone or in combination, visible, revealable, and/or machine readable information or data. "Front" and "back" views of the assembly 220 are depicted in FIGS. 7A & 7B respectively, more particularly, front 222 and rear 224 viewable or exterior surfaces thereof.

Figure 11A:
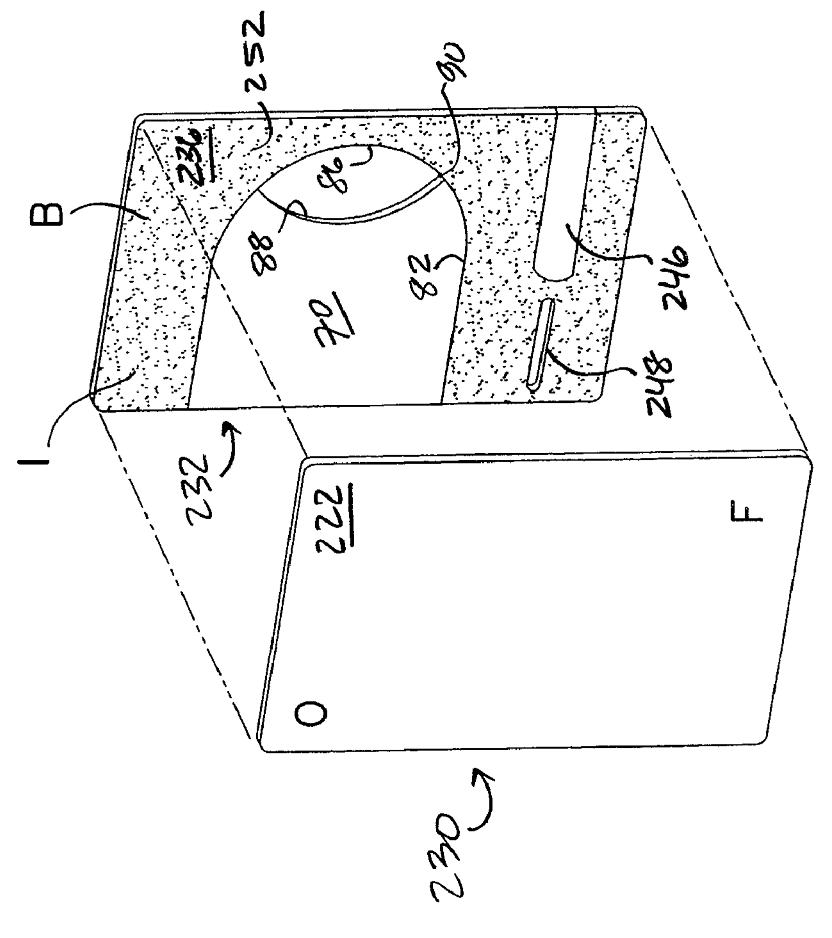

The promotional assembly 220 is characterized by a compartment or pocket, and corresponding compartment ingress/egress, with such features generally delimited by selective affixation of the panels of the assembly (FIG. 11A). More particularly, and as shown in connection to FIGS. 7B & 8, a compartment 70, accessible via ingress/egress 72 at major edge 74 of the assembly, is provided for receipt and retention of a machine readable data storage article, e.g., a CD, DVD, etc. 76, a portion thereof advantageously viewable via a "window" (i.e., aperture or cut-out 78). As will be later discussed, a panel of the panels of the assembly is adapted, as by the inclusion of slits or the like, so as to permit an interference fit for the article or media so received (FIG. 8). The subject embodiment is especially well suited, but is not so limited, to function as a "kit," more particularly, a package for a prepaid edition of software. Although not depicted, the assembly of FIG. 7 is readily adapted to include features of the embodiments of FIG. 1 and/or FIG. 5, with mixing and matching of the several features into one or more "hybrid" articles or assemblies contemplated.

As to the first panel 230 (FIG. 9), the first surface 234 thereof defines first exterior surface 222 for the promotional assembly (FIG. 7A) and advantageously includes or bears promotional information thereon, namely, static graphics such as, for example, source identifying indicia. The first surface 234 of the first panel 230 essentially or primarily functions as a "canvas," i.e., a message conveyance medium.

The second surface 236 of the first panel 230 (FIG. 7B) generally includes at least a single information or data field containing information/data, more particularly, and preferably as shown, a pair of variable data fields 238, 240 containing, by way of reference only, a revealable access or activation code 242, and a visible product code 244. Although there need not be any particular configuration or other spatial relationship between the data fields of the first panel, it is advantageous, especially in connection to the inclusion of the compartment of the subject embodiment, to "bunch" or otherwise "group" the fields and locate the revealable access or activation code proximal to an edge of margin of the panel.

The second panel 232 (FIG. 10), which is in opposition to the first panel 230 and is selectively affixed thereto (FIG. 11), generally includes a portion or segment overlaying an information field of the at least a single information field of the second surface of the first panel of the assembly (FIG. 9B). Preferably, but not necessarily, the second panel includes or may be equipped with a machine-readable information or data field containing information/data.

The first surface 234 of the second panel 232 defines second exterior surface 224 for the promotional assembly (FIG. 7B) and advantageously includes or bears promotional information i.e., static graphics such as offer/redemption details and/or instruction related to the promotion, merchandise or service thereon. The portion or segment of the second panel overlying the information field of the at least a single information field is adapted such that select manipulation of the portion reveals information of the at least a single information field containing information underlying same. For example, the second panel includes a disengageable strip (e.g., a perforated removable tab 246 as shown) intended to overlay revealable variable data of the first panel, more particularly, revealable unique access or activation code 242 of the second surface 236 of the first panel 230. Other known concealment mechanism are likewise contemplated, advantageously, tamper evident concealment mechanisms such as mechanical structures (e.g., discrete strips, coverings, etc.), "scratch-off" coatings and the like, or alternate interfaces between portions of the panel of the assembly which permit removal in furtherance of viewing the revealable information or data.

Figure 10A:
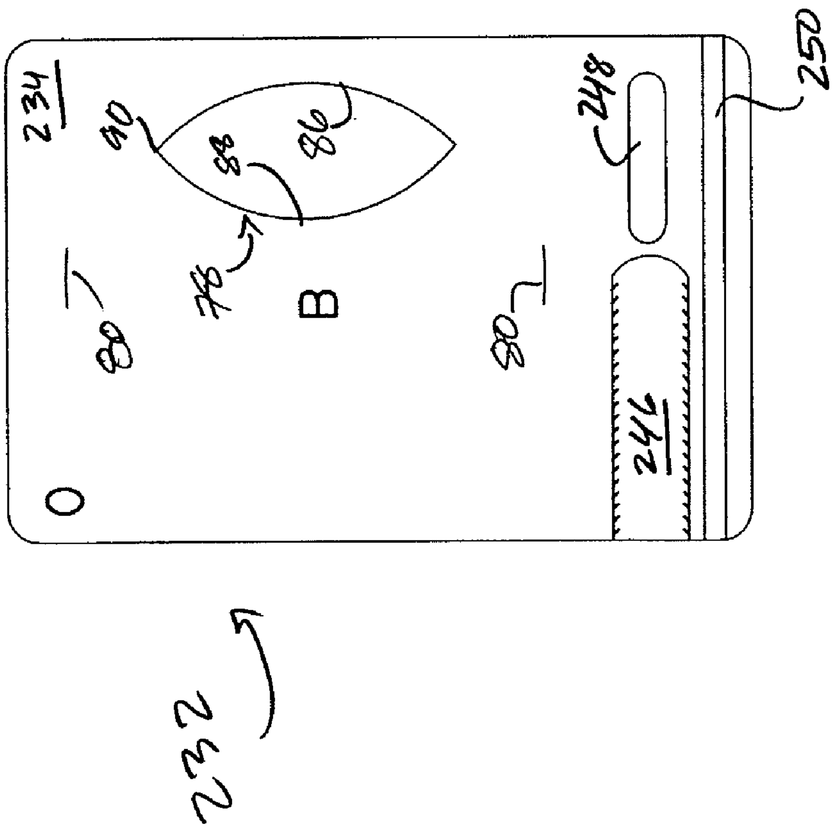
Figure 11B:
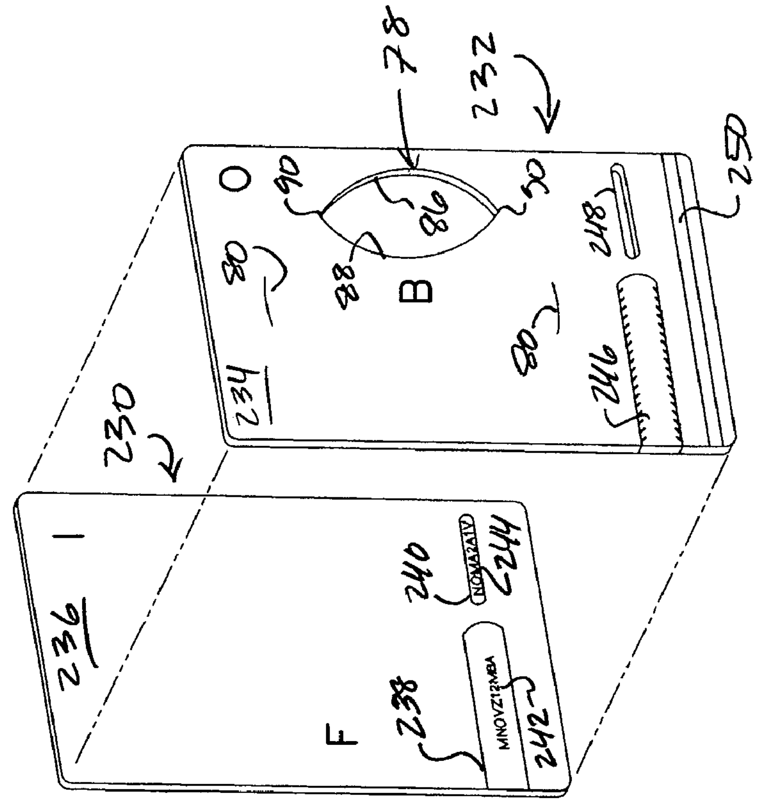

The second panel 232 further includes a "window" or cut-out adjacent or proximal perforated removable tab 246, namely, an aperture 248 as shown (FIG. 10), and may be equipped with a magstrip 250, advantageously as shown in any of FIGS. 7B, 10A, or 11B in connection with the first surface 234 of the second panel 232, or other such machine-readable information field containing machine readable information or code(s) such as optical characters (e.g., bar codes, UPC codes and the like), or more generally, digital information in forms generally well know as well as those emerging. Likewise, in conjunction thereto, or in the alternative, the assembly of the subject invention may easily be adapted to include integrated circuit chips and/or radio frequency identification (RFID) as the desired functionality of the assembly warrants. As should be readily appreciated, the machine-readable information of the machine readable information field may be amenable to direct (i.e., contact) reading, or remote reading as applications or circumstances warrant.

In furtherance of a "packaging" functionality, a panel of the panels of the assembly, more particularly, the second panel as shown, includes opposing paired slits 80 and a media viewing window 78, the combination of which substantially delimit a boundary 82 for the compartment 70 (see FIGS. 7B & 11A). The slits 80, or functional equivalents thereof (e.g., the removal of material, either completely as in the case of a slot, or partially as in the case of a notch or the like) enable displacement of the second panel 232, at least locally in the vicinity of the slits, upon receipt of the media 76 in the compartment 70 (FIG. 8), and are spaced apart sufficiently so as to accommodate receipt of the media therebetween (i.e., the distance between the slits substantially conforms to a maximum dimension of the media, namely, a diameter thereof as shown). Advantageously, but not necessarily, the slits 80 are of an arcuate configuration, having a sweep substantially corresponding to that associated with a curvature of a perimeter of the media. As should be appreciated with reference to FIG. 7B, the slits define "upper" and "lower" limits of the compartment 70 and assists in loading, holding and securing the media inside the assembly or card product.

The media window 78, which permits a view or peak at the media 76, advantageously a stylized portion or surface 84 thereof, is preferably, but not necessarily, lens shaped as best seen in FIG. 10. A first margin 86 of the window 78, more particularly, the arc adjacent the margin or edge of the panel (i.e., a major edge thereof), is configured so as to substantially conform with the curvature of a perimeter of the media, and thereby delimit a "depth" for the compartment relative to the ingress/egress thereof. A second margin 88 of the window 78, as shown, generally mimics (i.e., mirrors) the first margin thereof. The united end points of the window margins define stops 90 for the media 76 received within the compartment 70.

Generally, information of the at least a single information field of the at least a single information field containing information of the first panel is intended to register with corresponding features of the second panel which permit or are adapted to permit viewing the information. As best seen in connection to FIG. 11B, the window 248 of the second panel 232 overlays the information of an information field of the first panel, more particularly, the product code or information 242 of the second surface 236 of the first panel 230 (i.e., the panel window permits the visible information of the correspondingly aligned panel of the assembly to be readily visible or discernable to a viewer (FIG. 7B)).

With reference now to FIG. 11, an advantageous selective union of the panels is illustrated, namely, as referenced or depicted from the first sides 234 of the first 230 (FIG. 11A) and second 232 (FIG. 11B) panels. Adhesive 252 or the like is interposed between the panels 230, 232 in furtherance of their union (see also FIG. 8), with an effective amount preferably applied as shown to the second surface 236 of the second panel 232 while leaving that portion of the second surface of the second panel corresponding to the media compartment 70 and the perforated removable tab 246 free of any such coating or the like.

With regard to the manufacture or fabrication of the assembly of the subject inventions, the panels may be any thin sheet or web material having two major planar opposing sides which can be printed upon. Preferably, the panels comprise a flexible material which can be used with conventional, high speed, flexographic printing machines. Acceptable materials include metal foils, cellulose based products, fabrics, cloths, synthetics, etc., with card stock being especially advantageous.

It is intended that the article bear indicia as by printing on either sheet fed presses or web presses with virtually any kind of printing system, including, but not limited to, UV cured, water-based, heat-set, flexography, lithographic, offset, and/or digital. Preferably, a high speed printing process such as flexographic or offset lithography is used to print on continuous webs of thin flexible planar material for efficiency and cost. A printing method and machine capable of simultaneously printing the first and second sets of static graphic fields on the first and second sides of the web in one pass through the printer is preferred for efficiency, but single side printing in separate passes may be preferred for quality. Moreover, in furtherance of quality control and quality assurance with regard to at least the application of variable data to the web or sheet, more particularly, variable unique correlated or correlatable data, such as, without limitation, access codes, and/or other data uniquely associated with the code or with the person or entities ultimately assigned the code etc., known vision systems, or their functional equivalent, are utilized, and advantageously, such functionality incorporated into a multi-step or function press for the production of articles of the subject invention.

A preferred method of manufacture of a promotional consumer assembly of the subject invention includes selectively applying commercial indicia (e.g., promotional information) to a first surface of a single material in a multi-station press, a first portion of portions of the first surface of a single material thereby bearing a first characteristic commercial indicia (e.g., graphics, branding, and/or other source/merchandise identifying content connected to a promotion), a second portion of portions of the first surface of a single material thereby bearing a second characteristic commercial indicia (e.g., details of the promotion). Additional variable indicia (e.g., codes or other unique correlative character strings or the like) is selectively applied to areas of a first portion of portions of a second surface of the single material so as to define a plurality of variable indicia fields for the first portion. Finally, selective operations are performed upon areas of an entirety of the single material, the areas registerable with the plurality of variable indicia fields for the first portion of portions of the second surface of the single material.

It is to be understood that this disclosure, in many respects, is only illustrative. The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention and scope of the appended claims. Changes may be made in a variety of details, particularly in matters of shape, size, material, and arrangement of parts, as the case may be, without exceeding the scope of the invention.

What is claimed is:

1. A promotional article comprising coextensive first and second panels selectively and directly united to and with each other, a. said first panel having first and second surfaces, said first surface of said first panel defining a first exterior surface for the promotional article, said second surface of said first panel including at least a single information field containing information, and, b. said second panel having first and second surfaces, and an area overlaying an information field of said at least a single information field of said second surface of said first panel, said first surface of said second panel defining a second exterior surface for the promotional article, said second surface of said second panel being immediately adjacent said second surface of said first panel, said area overlaying an information field of said at least a single information field of said second surface of said first panel adapted such that select manipulation of said area overlaying an information field of said at least a single information field reveals information of said at least a single information field containing information underlying same.

2. The promotional article of claim 1 wherein said first and second panels comprise substantially identical material.

3. The promotional article of claim 1 wherein said first and second panels originate from a single sheet material.

4. The promotional article of claim 1 wherein said first and second panels comprise card stock.

5. The promotional article of claim 1 wherein said second surface of said first panel includes a further information field of said at least a single information field containing information.

6. The promotional article of claim 5 wherein said further information field is visible via a cut-out of said second panel.

7. The promotional article of claim 1 wherein said second surface of said first panel includes a further information field of said at least a single information field containing information, said further information field adjacent to said information field of said at least a single information field containing information.

8. The promotional article of claim 7 wherein said further information field is visible via a cut-out of said second panel.

9. The promotional article of claim 1 wherein selective union of coextensive first and second panels delimits a compartment for housing a machine readable data storage article.

10. The promotional article of claim 1 further comprising a compartment for housing a machine readable data storage article between portions of said first and second panels.

11. The promotional article of claim 10 wherein said compartment is accessible via an edge of the article.

12. The promotional article of claim 10 wherein said second panel includes a relief area permitting displacement of a portion of said second panel in furtherance of receipt and retention of the machine readable data storage article in said compartment.

13. The promotional article of claim 12 wherein said relief area is delimited by opposingly paired slits.

14. The promotional article of claim 12 wherein said second panel includes a cut-out to permit viewing of a portion of the machine-readable data storage article housed within said compartment.

15. The promotional article of claim 12 wherein said second panel includes an elongate cut-out to permit viewing of an edge portion of the machine-readable data storage article housed within said compartment.

16. The promotional article of claim 1 further comprising a line of weakness through the panels of the article so as to define a disintegratable promotional subassembly.

17. The promotional article of claim 16 wherein said disintegratable promotional subassembly is configured to meet ISO specifications for transaction cards.

18. The promotional article of claim 16 wherein said disintegratable promotional subassembly comprises a transaction card.

19. The promotional article of claim 18 wherein said transaction card includes said portion of said second panel overlaying an information field of said at least a single information field.

20. The promotional article of claim 18 wherein said transaction card includes a machine-readable information field containing machine-readable information.

21. The promotional article of claim 18 wherein said disintegratable promotional subassembly further comprises a key fob separable from said transaction card.

22. The promotional article of claim 16 wherein said disintegratable promotional subassembly comprises a line of weakness delimiting detachable elements.

23. The promotional article of claim 22 wherein said detachable elements comprise a transaction card and a key fob.

* * * * *